Jan. 8, 1963 W. F. LEUTHNER 3,072,356
FISHING LINE REEL
Filed Dec. 2, 1959
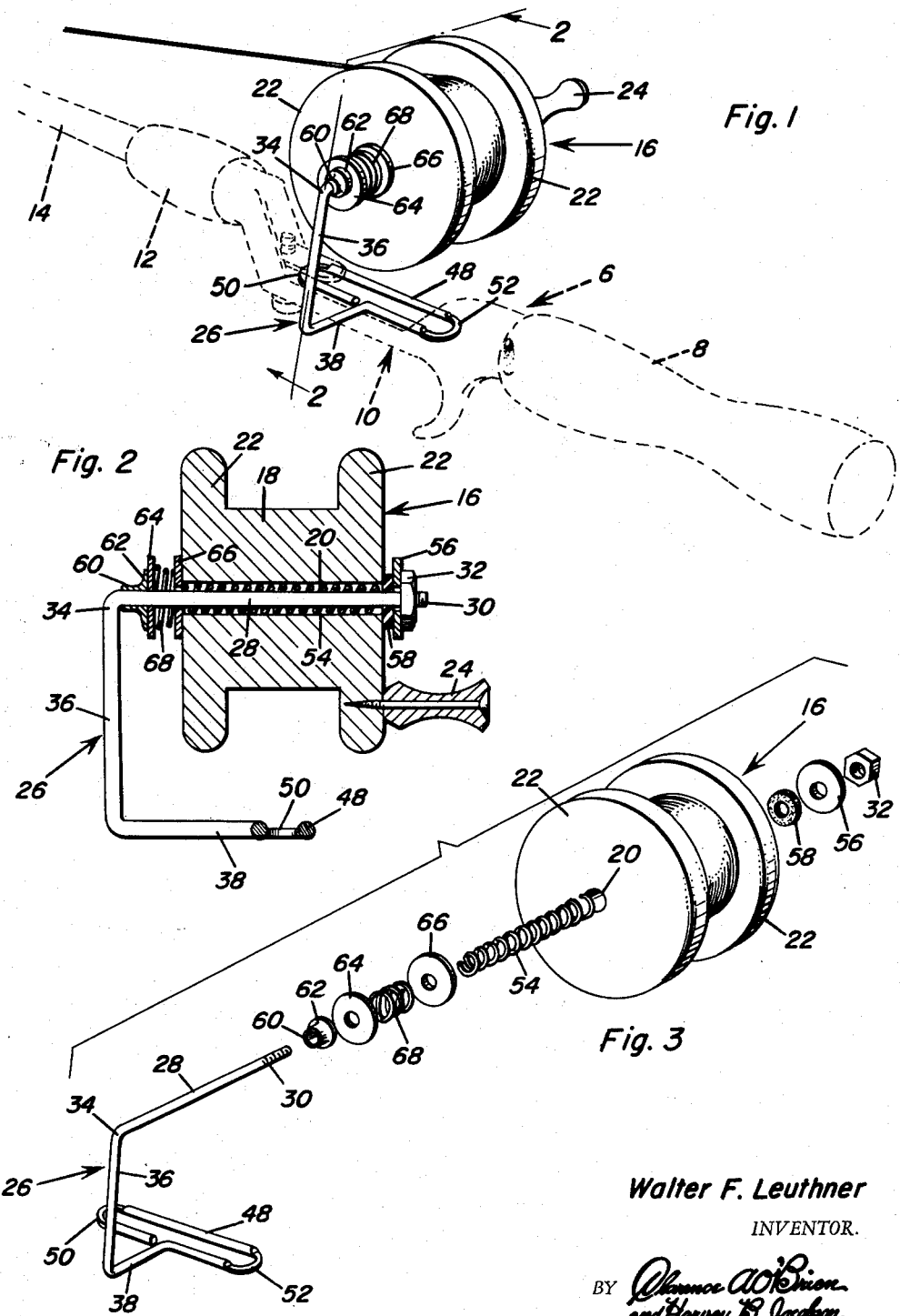
Walter F. Leuthner
INVENTOR.

United States Patent Office 3,072,356
Patented Jan. 8, 1963

3,072,356
FISHING LINE REEL
Walter F. Leuthner, 315 Hawthorne, Alexandria, Minn.
Filed Dec. 2, 1959, Ser. No. 856,706
2 Claims. (Cl. 242—84.5)

This invention relates to a novel reel construction for a fishing line and comprises means for attaching the reel to the conventional reel-seat of a fishing rod handle. Prior rod-type casting reels, as a general rule, are expensive, often quite complicated and are engineered to appeal to experienced anglers. Some reels are cheaply made for sale as "substitutes" but are not quality reels despite the fact that they are equipped with special bearings, brakes, and generally needed facilities such as line guides and eveners, tension controls, and the like. The instant concept, by contrast, has to do with a simplified reel devised primarily for beginners and inexperienced would-be fishermen. It is made in a manner to provide a highly simple, practical and inexpensive reel for trolling, casting and jigging, but requires no special training and skills for effective and reliable results.

In a preferred embodiment of the invention two essential components are combined; namely, a specially constructed bracket, and a reel or spool which is removably and rotatably mounted on a portion of the bracket expressly provided therefor.

The bracket is novel in that it is provided at a lower end with an adapter or base. This adapted is preferably in the form of an elongated loop-shaped member which may be mounted in and attached to a reel-seat such as is commonly provided on a conventional type of fishing rod handle. The upper portion of the bracket is fashioned into a shaft or axle which permits the spool to be applied and removed expeditiously. The spool itself is a one-piece body having a hub and flanges at the ends thereof providing line spooling and retaining heads.

Another improvement includes an appropriately constructed coil spring constituting an anti-friction bearing, said spring snugly lining the bore in the hub portion of the spool whereby the spool is freely rotatable.

Further the axle is provided on one end with a coil spring arranged between washers with the parts so assembled and mounted on the axle that yieldable tensioning means is provided. This yieldable but tension exerting means cooperates with the adjacent end of the spool in a manner to reduce back-lashing to a minimum.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIG. 1 is a view in perspective of a simplified beginner's-type reel constructed in accordance with the invention and showing how the bracket may be attached to a conventional reel-seat on a fishing rod handle, the handle appearing in phantom lines;

FIG. 2 is a view in section and elevation taken on the plane of the line 2—2 of FIG. 1; and FIG. 3 is an exploded perspective view showing all of the components drawn in orderly relationship and how they are assembled and fit together.

In FIG. 1 the numeral 6 designates a fishing rod handle which is used here as a mount for the invention. It embodies a suitable hand-grip 8, a conventional type reel-seat 10 and a chuck or the like 12 for the fishing rod 14. The present invention may be used with or without a rod.

The spool 16 is of one-piece construction and embodies a hub portion 18 having a central bore 20 and flanged end portions 22 providing line confining heads. Any suitable type of a hand-grip or handle 24 may be eccentrically mounted on one end of the spool.

The spool attaching, retaining and elevating bracket is denoted generally by the numeral 26. It is preferably constructed from a single length of sturdy or stout wire which is shaped in the manner illustrated. This bracket is generally U-shaped and comprises an upper linearly straight relatively long limb 28 screw-threaded at the free end 30 to accommodate a nut 32 in the manner shown in FIG. 2. The left-hand end portion of the limb provides a stop 34 to be hereinafter described and the bight portion 36 provides the elevating and offsetting member, this being joined to the lower relatively short limb 38 which is bent upon itself at the free end to provide a right angularly disposed horizontally usable adapter. This part may be referred to as a loop-shaped adapter or base 48 the end portions 50 and 52 of which have flattened surfaces to facilitate lodging the same in the existing portions of the aforementioned reel-seat 10 to be held in place in the manner illustrated in FIG. 1. The base 48, as shown, has planar seating surfaces by which it is seated on the reel-seat. Obviously the upper limb 28 provides a shaft or an axle on which the spool 16 is removably and rotatably mounted. It will be noticed in FIG. 2 in particular that the bore 20 is lined or bushed with a coil spring 54, thus providing an efficient bearing for the free running spool. At the right hand end as seen in FIG. 2 a metal or rigid washer 56 abuts the nut 32 and an elastic sleeve-type washer 58 is interposed between the washer 56 and the cooperating end portion of the bore 20. At the opposite end a yielding back-lash preventing means tensioning means is provided comprising a sleeve 60 surrounding the axle and abutting the stop 34. The flange 62 on the sleeve serves to accommodate a first washer 64 cooperable with a spaced second washer 66. A coil spring of suitable strength as at 68 is interposed between the washers and surrounds the axle in the assembled manner seen in FIG. 2.

The construction is capable of being mass-produced. It is also such as to allow for determination of the height or distance of the reel from the rod. The length of the axle may be varied in manufacture and various sized spools utilized interchangeably. The construction of the components is such that the user himself may take care of replacements. With this invention one is provided with a fishing reel which is easily handled, makes for wide range of adjustment of tension of the spool and permits the reel to be used for trolling, casting, and jigging. The spool may be made of any suitable material, of any size or design for fly casting, trolling, jigging or winter fishing. The height of the reel from the rod may be varied to allow for different modes of fishing. The length of the axle may be varied to allow for different sizes of spools.

The control of tension by the spring and washer on the spool which allows its use by inexperienced fishermen with little or no skill in casting, is a desirable feature of the concept. It will also be noticed that the reel is the same in construction at each end and is capable of being reversed to accommodate left-handed users.

The present invention serves to provide a fishing reel which is of simple construction and readily and economically fabricated and assembled on a mass production basis; provides a design which allows height from rod and length of axle to be easily varied in manufacture and various sizes and spools to be interchanged. The parts may be easily and economically replaced by the user. Also, this improved fishing reel may be easily handled by the beginner, quickly allows him a wide range of adjustment of tension on the spool, and permits the same reel to be used in all modes of fishing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a fishing rod handle having a reel seat, a one-piece reel bracket made of a single rod-like member, said bracket being U-shaped and including an upper limb defining an axle, a lower limb of shorter length than said upper limb, a bight portion connecting and spacing the corresponding ends of said limbs, said lower limb terminating in an elongated loop-shaped base extending transversely of said lower limb and integrally joined at its mid portion to the latter and having a planar mounting surface with flattened surfaces at its opposite ends for engagement by fasteners to anchor the bracket to a fishing rod handle, the free outer end of said upper limb overhanging and projecting beyond the adjacent outer side of said base and being screw-threaded and provided with an assembling and retaining nut and a thrust washer, the juncture of adjacent ends of said upper limb and bight portion providing a stop, a sleeve mounted upon said upper limb abutting said stop, said sleeve having a flange defining a shoulder, first and second washers mounted on said upper limb with said first washer abutting said shoulder, a coil spring between said first and second washers and surrounding said upper limb, a reel having a bored hub rotatably mounted on said upper limb between and engaged by said thrust and said second washers, said coil spring biasing said second washer into frictional braking contact with said reel.

2. The combination of claim 1 including an elongated coil spring disposed in said reel hub and surrounding said upper limb and providing a bearing journaling said reel hub upon the upper limb, said elongated coil spring having its ends abutted against said second washer and said thrust washer.

References Cited in the file of this patent
UNITED STATES PATENTS

| | | |
|---|---|---|
| 539,118 | Carle | May 14, 1895 |
| 556,592 | Trachsel et al. | Mar. 17, 1896 |
| 745,825 | Guthrie | Dec. 1, 1903 |
| 812,023 | Dickson | Feb. 6, 1906 |
| 1,513,893 | Coleman | Nov. 4, 1924 |
| 1,746,981 | Anderson | Feb. 11, 1930 |
| 1,940,345 | Brownlee | Dec. 19, 1933 |
| 2,550,271 | Kagel | Apr. 24, 1951 |
| 2,731,756 | Nelson | Jan. 24, 1956 |